(12) United States Patent
Byun

(10) Patent No.: US 9,015,387 B2
(45) Date of Patent: Apr. 21, 2015

(54) SEMICONDUCTOR DEVICE AND OPERATING METHOD THEREOF

(71) Applicant: SK Hynix Inc., Gyeonggi-do (KR)

(72) Inventor: Eu-Joon Byun, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 70 days.

(21) Appl. No.: 13/927,179

(22) Filed: Jun. 26, 2013

(65) Prior Publication Data

US 2014/0006693 A1    Jan. 2, 2014

(30) Foreign Application Priority Data

Jul. 2, 2012    (KR) ........................ 10-2012-0071978

(51) Int. Cl.
*G06F 12/02*  (2006.01)
*G06F 3/06*  (2006.01)

(52) U.S. Cl.
CPC ........ *G06F 12/0246* (2013.01); *G06F 12/0253* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 2010/0082886 A1 | 4/2010 | Kwon et al. | |
| 2011/0145238 A1* | 6/2011 | Stork | ............................ 707/737 |
| 2013/0238851 A1* | 9/2013 | Chang et al. | .................. 711/113 |

FOREIGN PATENT DOCUMENTS

KR    1020100037319    4/2010

* cited by examiner

*Primary Examiner* — Scott Sun
(74) *Attorney, Agent, or Firm* — IP & T Group LLP

(57) ABSTRACT

An operating method of a semiconductor device includes selecting a block requiring storage space recycling from a memory device, checking costs required for performing the respective recycling techniques, selecting one of the recycling techniques based on the costs, and recycling a storage space by applying the selected recycling technique to the selected block.

15 Claims, 7 Drawing Sheets

SEMICONDUCTOR DEVICE AND OPERATING METHOD THEREOF

CROSS-REFERENCE TO RELATED APPLICATIONS

The present application claims priority of Korean Patent Application No. 10-2012-0071978 filed on Jul. 2, 2012, which is incorporated herein by reference in its entirety.

BACKGROUND

1. Field

Exemplary embodiments of the present invention relate to a semiconductor device for controlling a memory device and an operating method thereof, and more particularly, to a memory device capable of recycling a storage space of a memory device, a system including the same, and an operating method thereof.

2. Description of the Related Art

A flash memory is a type of a nonvolatile memory device and is generally controlled by a control structure referred to as a flash translation layer (FTL).

Basically, a flash memory device may not overwrite data. Therefore, in order to write new data at the same physical position, existing data must be erased first. In general, a program operation is performed in a page unit and an erase operation is performed in a block unit (including a plurality of pages), so that valid pages and invalid pages may coexist in one block.

For example, a conventional flash memory using page level mapping first selects a victim block of which a storage space having invalid pages is to be recycled, and applies a garbage collection technique to the victim block, thereby preventing the storage space from being wasted due to invalid pages.

In the conventional flash memory, however, when the storage space is uniformly recycled according to one method (e.g. garbage collection technique), the time cost may be wasted for the operation to of recycling the storage space. Thus, the performance of a memory device or a system including the memory device may be degraded.

Therefore, there is a demand for a technique for recycling a storage space while minimizing the performance degradation of the memory device or the system.

SUMMARY

Various embodiments are directed to a semiconductor device capable of recycling a storage space of a memory device while minimizing the performance degradation of the memory device and a system including the semiconductor device, and an operating method thereof.

In an embodiment, an operating method of a semiconductor device may include selecting a block requiring storage space recycling from a memory device, checking costs required for performing the respective recycling techniques, selecting one of the recycling techniques based on the costs, and recycling a storage space by applying the selected recycling technique to the selected block.

In an embodiment, an semiconductor device may include a block selection unit suitable for selecting a block requiring recycling from a memory device, a cost calculation unit suitable for calculating costs required for performing the respective recycling techniques applicable to the block, a recycling technique selection unit suitable for selecting any one of the recycling techniques based on the calculated costs, and a storage space recycling execution unit suitable for recycling a storage space by applying the selected recycling technique to the block.

In an embodiment, a system may include a memory device and a processor. The processor may perform selecting a block requiring storage space recycling from a memory device, checking costs required for performing the respective recycling techniques, selecting one of the recycling techniques based on the costs, and recycling a storage space by applying the selected recycling technique to the selected block.

In an embodiment, a processor-readable storage medium may store steps executed by a processor. The steps may include selecting a block requiring storage space recycling from a memory device, checking costs required for performing the respective recycling techniques, selecting one of the recycling techniques based on the costs, and recycling a storage space by applying the selected recycling technique to the selected block.

In an embodiment, an operating method of a system may include selecting a victim block from a memory device, checking costs required for performing candidate recycling techniques, selecting a recycling technique having a minimum cost, and executing the selected recycling technique to the selected victim block.

DETAILED DESCRIPTION

Figure 1:
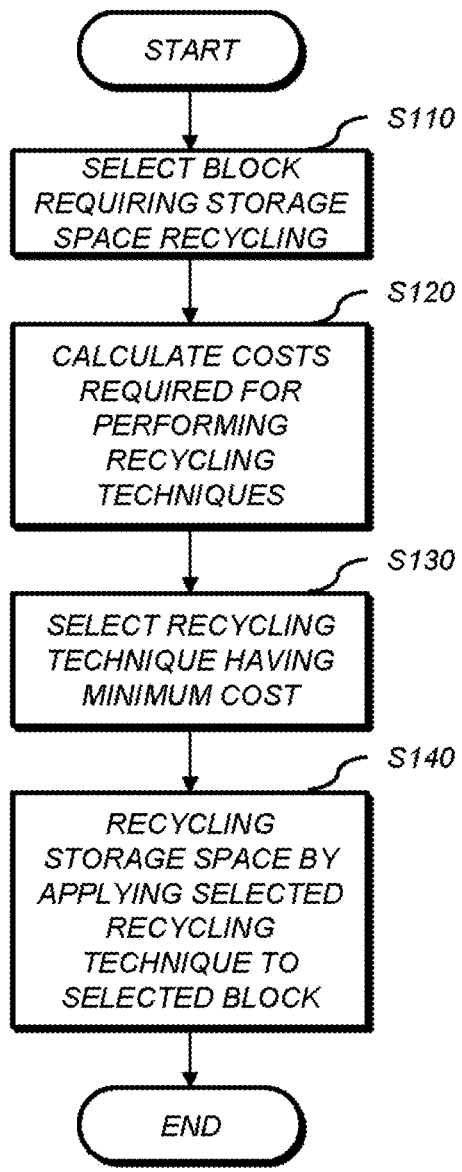
FIG. 1 is a flow chart illustrating an operating method of a semiconductor device according to an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like parts in the various figures and embodiments of the present invention. In addition, a singular form may include a plural form as long as it is not specifically mentioned in a sentence.

The embodiments of the present invention provide a semiconductor device for controlling a flash memory to which page level mapping is applied and an operating method thereof. However, it is obvious to those skilled in the art that a memory device controlled by the semiconductor device and the operating method thereof is not limited to a flash memory, but may be applied to different types of memory devices that require storage space recycling.

FIG. 1 is a flow chart illustrating an operating method of a semiconductor device according to an embodiment of the present invention The operating method according to the embodiment of the present invention includes selecting a block requiring storage space recycling in a memory device at step S110 calculating costs required for performing the respective recycling techniques at step S120, selecting a recycling technique having the minimum cost at step S130, and recycling the storage space by applying the selected recycling technique to the selected block at step S140.

At the step S110 of selecting a block requiring storage block recycling (hereafter, referred to as a victim block), the victim block may be selected according to conventional standards. For example, a block in which the number of valid pages is the smallest, that is, a block of which the utilization rate is the lowest may be selected as the victim block.

In the case of the conventional flash memory, the storage space recycling technique has been fixed to one technique such as garbage collection. In this embodiment of the present invention, however, the storage space recycling technique is not limited to one technique.

For example, a merge technique may be considered as one of the storage space recycling techniques. Furthermore, a garbage collection technique or other techniques may also be considered as one of the storage space recycling techniques. The garbage collection technique and the merge technique will be described with reference to FIGS. 2, 3a, and 3b.

Figure 2:
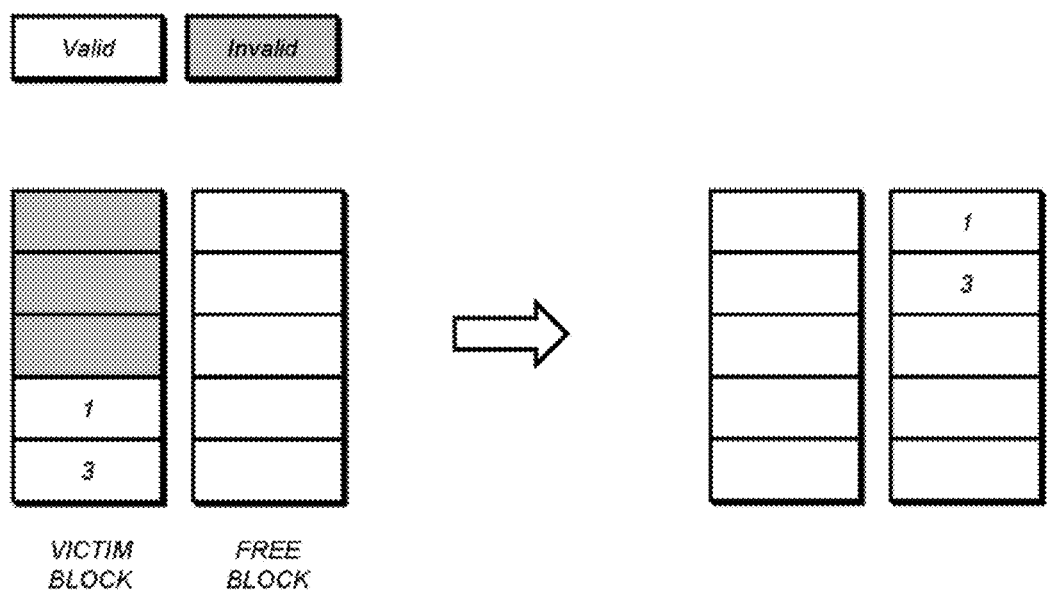
FIG. 2 is a diagram for explaining a garbage collection technique.

FIG. 2 is a diagram for explaining a method for performing garbage collection. Hereafter suppose that one block includes five pages for convenience of explanation. In FIG. 2, a gray page represents an invalid page, and a white page represents a valid page or empty page.

When a victim block is selected for garbage collection, a free block is required to recycle the victim block. Valid pages of the victim block are written into the free block and the entire victim block is erased. Then, the garbage collection is completed.

Referring to FIG. 2, it may be seen that the number of writable pages is increased by three as a result of the garbage collection.

Figure 3A:
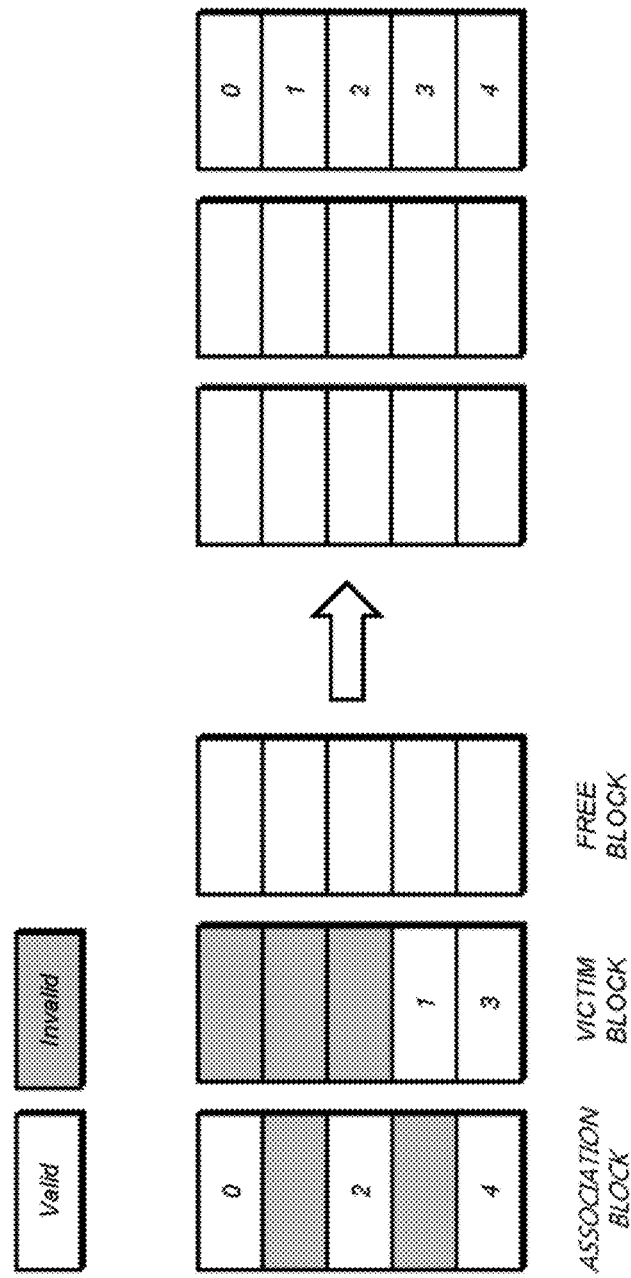
FIGS. 3a and 3b are diagrams for explaining a merge technique.
Figure 3B:
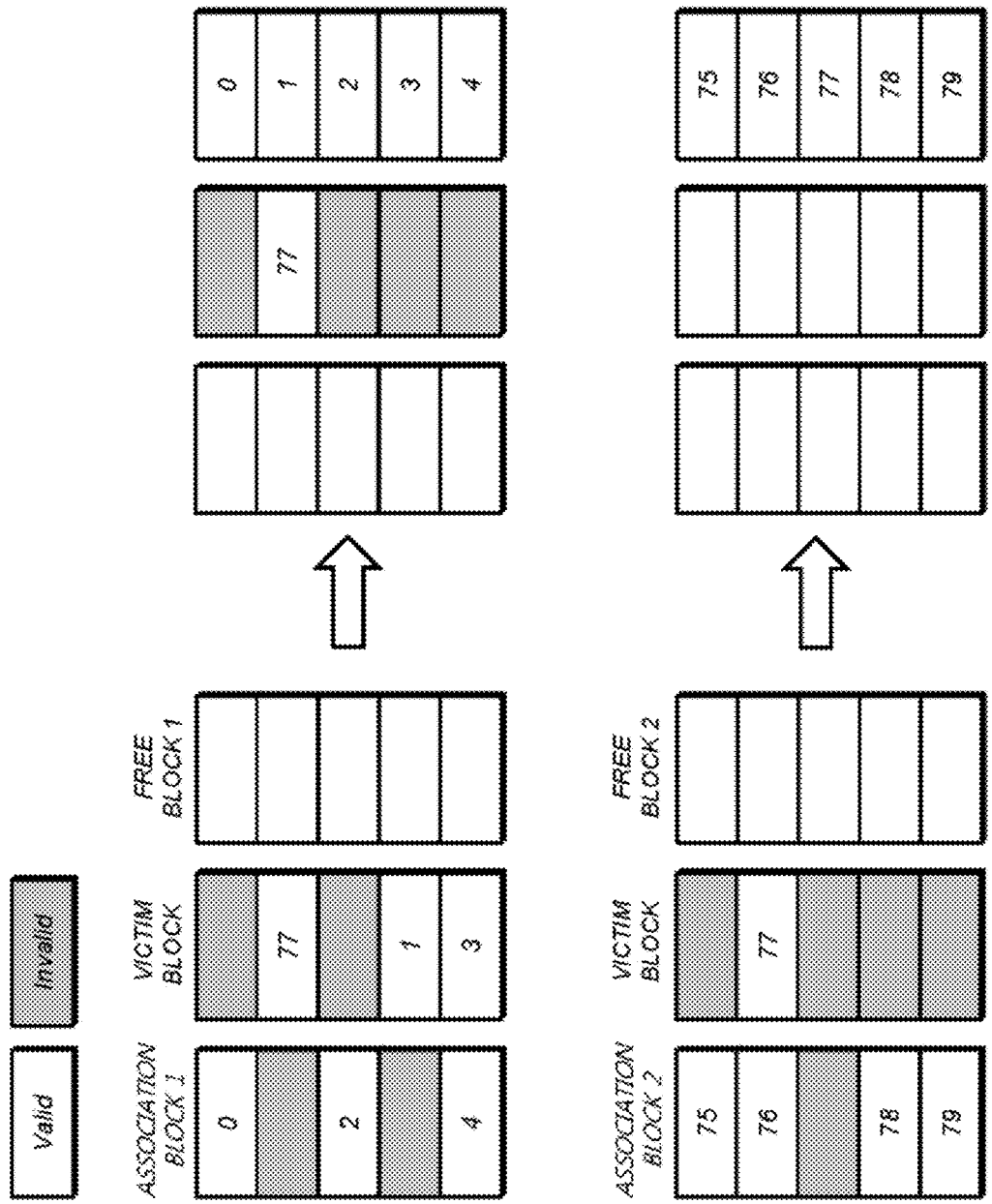

FIGS. 3a and 3b are diagrams for explaining a method for performing a merge operation. In order to perform a merge operation, an association block associated with a selected victim block and a free block are required.

The association block indicates a block that may be used to generate a new block including successive pages by merging valid pages of the association block and valid pages included in the victim block.

Depending on cases, one victim block may require a plurality of association blocks. An association count represents how many association blocks are present. Once the victim block is selected, association blocks of the victim block may be selected.

FIG. 3a is a diagram for explaining a case in which the association count is one. When the victim block is selected, an association block of the victim block is selected. Then, valid pages within the victim block and the association block are written into the free block, and the victim block and the association block are erased. In this way, the merge operation is completed. Referring to FIG. 3a, it may be seen that the number of writable pages is increased by five as a result of the merge operation.

FIG. 3b is a diagram for explaining a case in which the association count is two. When the association count is two, two association blocks exist.

First, valid pages of the victim block and an association block 1 are written into a free block 1, and the association block 1 is erased. In this way, a primary merge operation is completed. Then, remaining valid pages of the victim block in which the primary merge operation has been performed and valid pages of the association block 2 are written into a free block 2, and the victim block and the association block 2 are erased. In this way, the merge operation is completed. Referring to FIG. 3b, it may be seen that the number of writable pages is increased by five as a result of the merge operation.

In this embodiment of the present invention, the merge technique and the garbage collection technique were taken as examples of the storage space recycling techniques applicable to the victim block. However, the storage space recycling techniques are not limited thereto, and other techniques may be selected.

Referring back to FIG. 1, the costs required for performing the respective storage space recycling techniques to be applied to the victim block are calculated at step S130.

At this time, the cost indicates a cost per unit page. It may be calculated by dividing the total cost required for recycling the storage space by the number of writable pages that is additionally obtained as a performance result of the storage space recycling technique.

Equations 1 and 2 represent the total cost and the cost per unit page, which are required for performing garbage collection.

$$\text{Total Cost} = (\mu \times N \times C_{copy}) + C_{erase} \quad \text{[Equation 1]}$$

$$\text{Page Cost} = \frac{(\mu \times N \times C_{copy}) + C_{erase}}{(1 - \mu) \times N} \quad \text{[Equation 2]}$$

Equations 3 and 4 represent the total cost and the cost per unit page, which are required for performing the merge operation.

$$\text{Total Cost} = N \times C_{copy} + 2 \times C_{erase} \quad \text{[Equation 3]}$$

$$\text{Page Cost} = C_{copy} + \frac{2 \times C_{erase}}{N} \quad \text{[Equation 4]}$$

In the above-described equations, $\mu$ represents a ratio of effective pages within a block (page utilization rate) N represents the total number of pages within the block $C_{copy}$ represents a cost required for storing one page in a free block, and $C_{erase}$ represents a cost required for erasing one block.

The above-described equations are examples for calculating costs required for applying the respective techniques. Depending on embodiments, other elements may be additionally considered to calculate the costs. Various equations required for cost calculation may be derived by those skilled in the art according to the embodiments.

The costs may be calculated by directly performing an operation using necessary values. In another embodiment, a victim block and a cost lookup table to store costs that are previously calculated on the basis of information on various recycling techniques may be prepared, and the costs may be calculated only by referring to the cost lookup table at the step of calculating the costs according to the recycling techniques.

Referring back to FIG. 1, when the costs required for performing the respective recycling techniques applicable to the victim block are calculated, a recycling technique to be applied to the victim block is selected based on the costs. At this time a technique in which the cost per unit page is the lowest may be selected as the recycling technique to be applied to the victim block.

Figure 4:
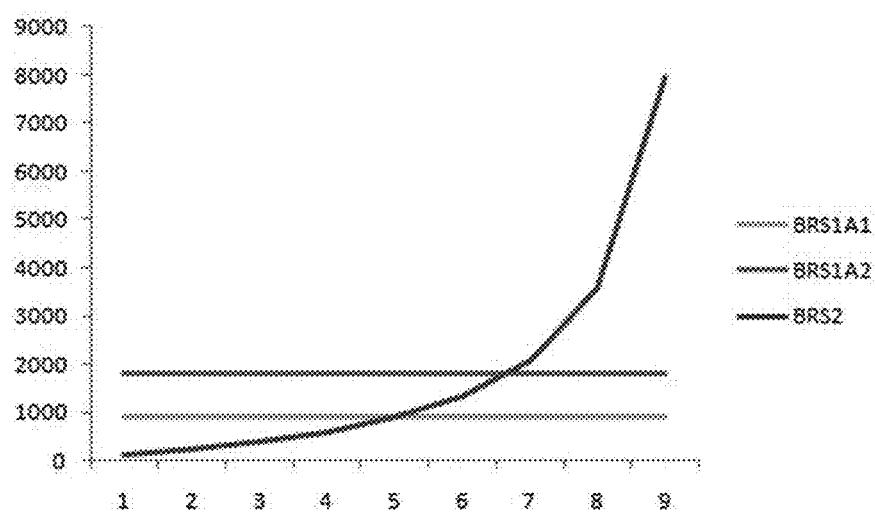
FIG. 4 is a graph illustrating a result obtained by comparing costs per unit page when a plurality of recycling techniques are applied.

FIG. 4 is a graph illustrating a result obtained by comparing costs per unit page when a plurality of recycling techniques are applied.

In an experiment for FIG. 4, suppose that one buffer includes 128 pages, $C_{erase}$ is 3,000, and $C_{copy}$ is 860.

In FIG. 4, a horizontal axis of the graph represents a utilization rate of the victim block based on 10 (10*valid page number of victim block 128), and a vertical axis of the graph represents a calculated cost per unit page.

In FIG. 4, BRS1A1 represents the characteristics curve of a case in which the association count is one when the merge technique is applied (for example, FIG. 3a), BRS1A2 represents the characteristics curve of a case in which the association count is two when the merge technique is applied (for example, FIG. 3b), and BRS2 represents the characteristics curve of a case in which the garbage collection technique is applied (for example, FIG. 2).

When the merge technique is applied, only one association number is set according to the victim block. Thus, only one of BRS1A1 and BRS1A2 may be selected as a candidate in a real environment.

For example, when BRS1A1 may be selected as a candidate and the utilization rate of the victim block is less than about 50% the cost per page in the garbage collection technique is lower than the cost per page in the merge technique. When the utilization rate is equal to or more than about 50%, the cost per page in the merge technique is lower than the cost per page in the garbage collection technique.

Thus, when the utilization rate is less than about 50%, the garbage collection technique is applied to the victim block, but when the utilization rate is equal to or more than 50% the merge technique is applied to victim block.

For example, when BRS1A2 may be selected as a candidate and the utilization rate of the victim block is less than about 65%, the cost per page in the garbage collection technique is lower than the cost per page in the merge technique. When the utilization rate is equal to or more than about 65%, the cost per page in the merge to technique is lower than the cost per page in the garbage collection technique.

Thus, when the utilization rate is less than 65%, the garbage collection technique is applied to the victim block, but when the utilization rate is equal to or more than 65%, the merge technique is applied to the victim block.

The steps of FIG. 1 may be stored in a program storage medium such as a nonvolatile memory device, for example, and executed by a semiconductor device.

Figure 5:
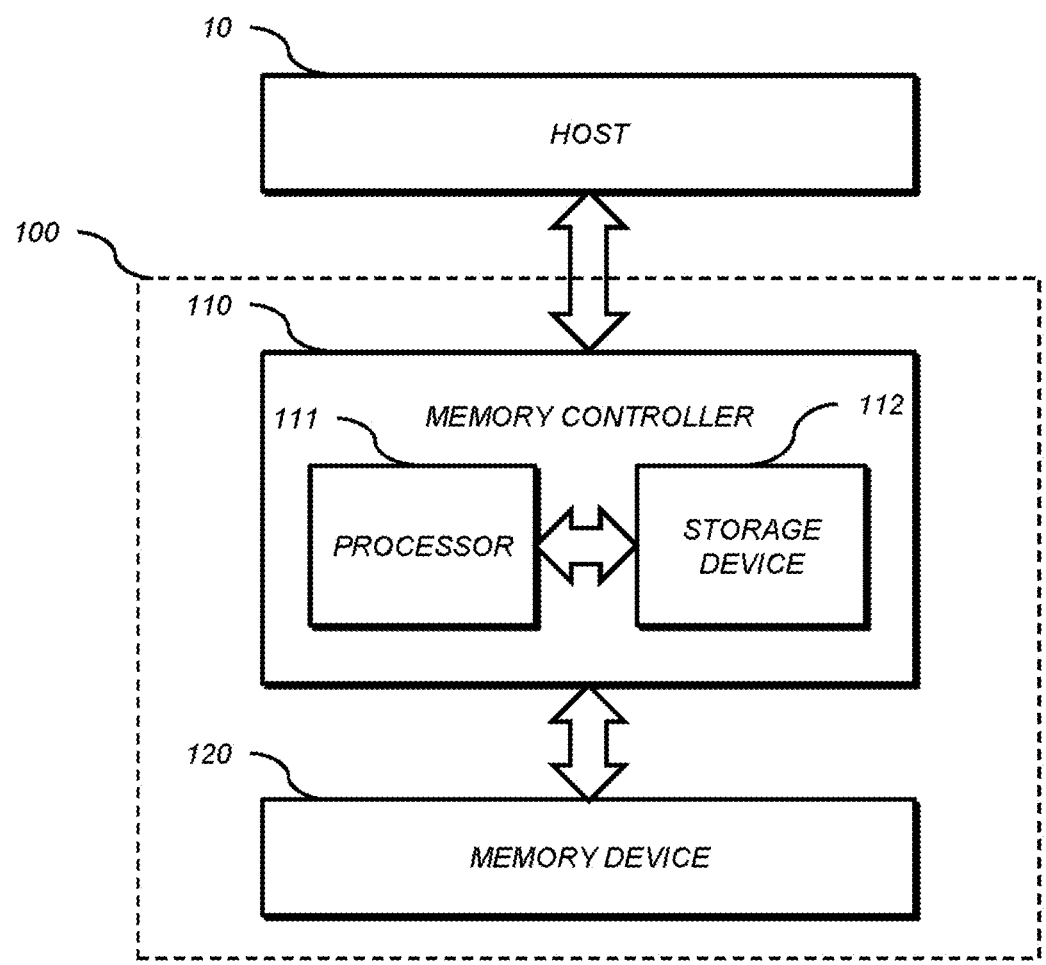
FIG. 5 is a block diagram illustrating a semiconductor device and a system including the same according to another embodiment of the present invention.

FIG. 5 is a block diagram illustrating a semiconductor device 110 and a system 100 including the same according to another embodiment of the present invention.

The semiconductor device 110 according to the embodiment of the present invention is provided between a host 10 and a memory device 120 and is suitable for controlling the memory device 120 according to a request from the host 10. The semiconductor device 110 according to the embodiment of the present invention may include a processor 111 and a storage device 112. The processor 111 is suitable for performing the steps of FIG. 1, and the storage device 112 is suitable for storing the steps performed by the processor 111.

Figure 6:
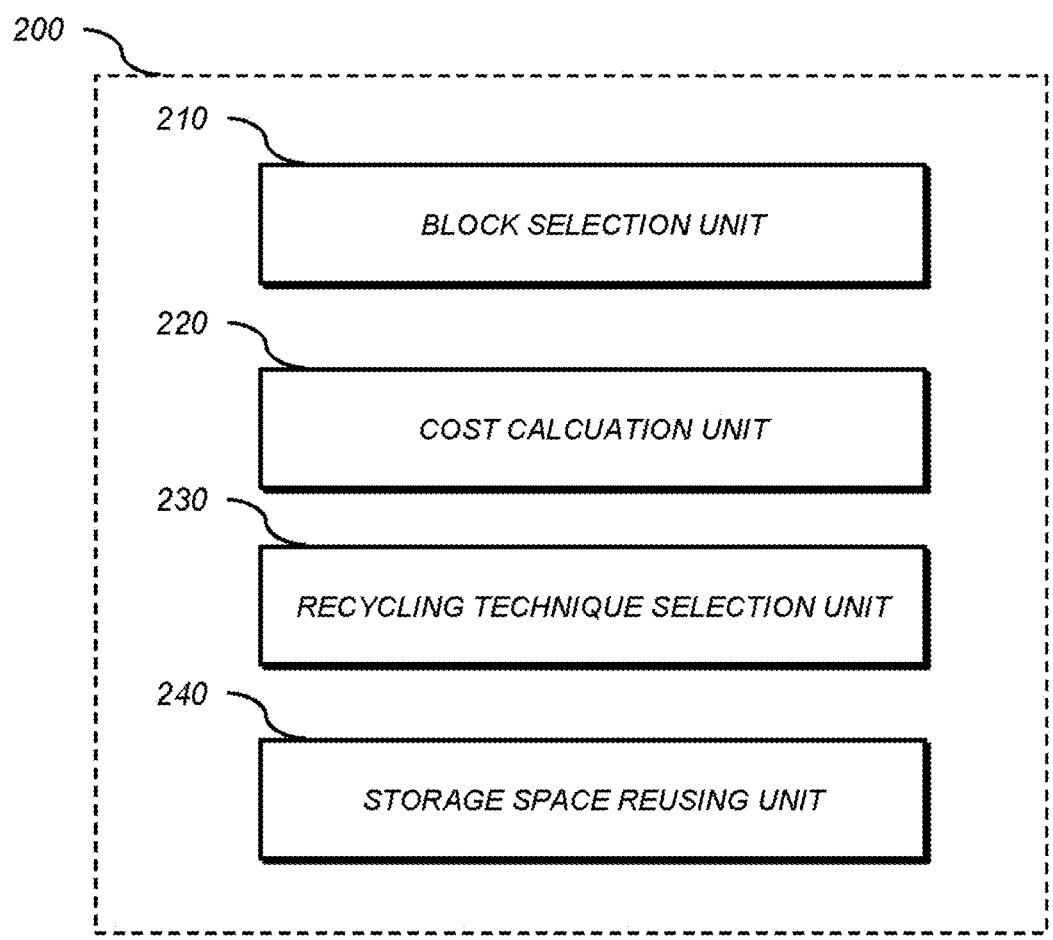
FIG. 6 is a block diagram illustrating a semiconductor device according to another embodiment of the present invention.

FIG. 6 is a block diagram illustrating a semiconductor device 200 according to another embodiment of the present invention.

The semiconductor device according to the embodiment of the to present invention includes a block selection unit 210, a cost calculation unit 220, a recycling technique selection unit 230, and a storage space recycling execution unit 240. The block selection unit 210 may select a block requiring storage space recycling (victim block). The cost calculation block 220 may calculate costs required for applying the recycling techniques selected as candidates to the selected victim block. The recycling technique selection unit 230 may select a recycling technique to be applied according to the calculated costs. The storage space recycling execution unit 240 may apply the selected recycling technique to the victim block.

The cost calculation block 220 calculates the costs for the candidate techniques when the victim block and the candidate blocks are determined. In this embodiment, a cost per page may be calculated by dividing the total cost required for performing each of the technique by the number of writable pages that is additionally obtained as a result received from applying the recycling technique.

In another embodiment, the cost calculation unit 220 may include a cost lookup table to store costs which have been previously calculated according to the utilization rate of the victim block and the applicable recycling techniques. In this case, the cost calculation unit 220 may refer to the cost lookup table to calculate a cost per page when each of the recycling techniques is applied to the selected victim block.

The recycling technique selection unit 230 may refer to the cost calculated by the cost calculation unit 220 and select a recycling technique having the minimum cost.

According to the embodiments of the present invention, a technique in which a cost required for recycling is the lowest among a plurality of usable storage space recycling techniques may be selectively applied to reduce a storage space of a memory device while minimizing performance degradation of the memory device and a system including the memory device.

Although various embodiments have been described for illustrative purposes, it will be apparent to those skilled in the art that various changes and modifications may be made without departing from the spirit and scope of the invention as defined in the following claims.

What is claimed is:

1. A semiconductor device comprising:
   a block selection unit suitable for selecting a block requiring recycling from a memory device;
   a cost calculation unit suitable for calculating costs required for performing the respective recycling techniques applicable to the block;
   a recycling technique selection unit suitable for selecting one of the recycling techniques based on the calculated costs; and
   a storage space recycling execution unit suitable for recycling a storage space by applying the selected technique to the block.

2. The semiconductor device of claim 1, further comprising a mapping control unit suitable for applying page level mapping to the memory device.

3. The semiconductor device of claim 2, wherein the memory device comprises a nonvolatile memory device.

4. The semiconductor device of claim 3, wherein the memory device comprises a flash memory.

5. The semiconductor device of claim 1, wherein the cost calculation unit calculates a cost per page by dividing the total cost required for performing one of the recycling techniques by the number of writable pages that is additionally obtained by performing the recycling technique.

6. The semiconductor device of claim 1, wherein the cost calculation unit comprises a lookup table that stores a cost per page calculated by dividing the total cost required for performing one of the recycling techniques by the number of writable pages that is additionally obtained by performing the recycling technique.

7. The semiconductor device of claim 5, the recycling technique selection unit selects a recycling technique in which the cost per page is the lowest among the plurality of recycling techniques.

8. The semiconductor device of claim 6, the recycling technique selection unit selects a recycling technique in which the cost per page is the lowest among the plurality of recycling techniques.

9. A system comprising a memory device and a processor, wherein the processor performs:
 selecting a block requiring storage space recycling from a memory device;
 checking costs required for performing the respective recycling techniques;
 selecting one of the recycling techniques based on the costs; and
 recycling a storage space by applying the selected recycling technique to the selected block.

10. The system of claim 9, wherein the checking of the costs comprises checking a cost per page obtained by dividing the total cost required for performing one of the recycling techniques by the number of writable pages that is additionally obtained by applying the recycling technique.

11. The system of claim 9, wherein the steps further comprise performing page level mapping on the memory device.

12. The system of claim 9, wherein the memory device comprises a nonvolatile memory device.

13. The system of claim 9, wherein the memory device comprises a flash memory.

14. An operating method of a system, comprising:
 selecting a victim block from a memory device;
 checking costs required for performing candidate recycling techniques;
 selecting a recycling technique having a lowest cost; and
 executing the selected recycling technique to the selected victim block.

15. The operating method of claim 14, wherein the candidate recycling techniques include a garbage collection technique and a merge technique.

* * * * *